Figure 1:
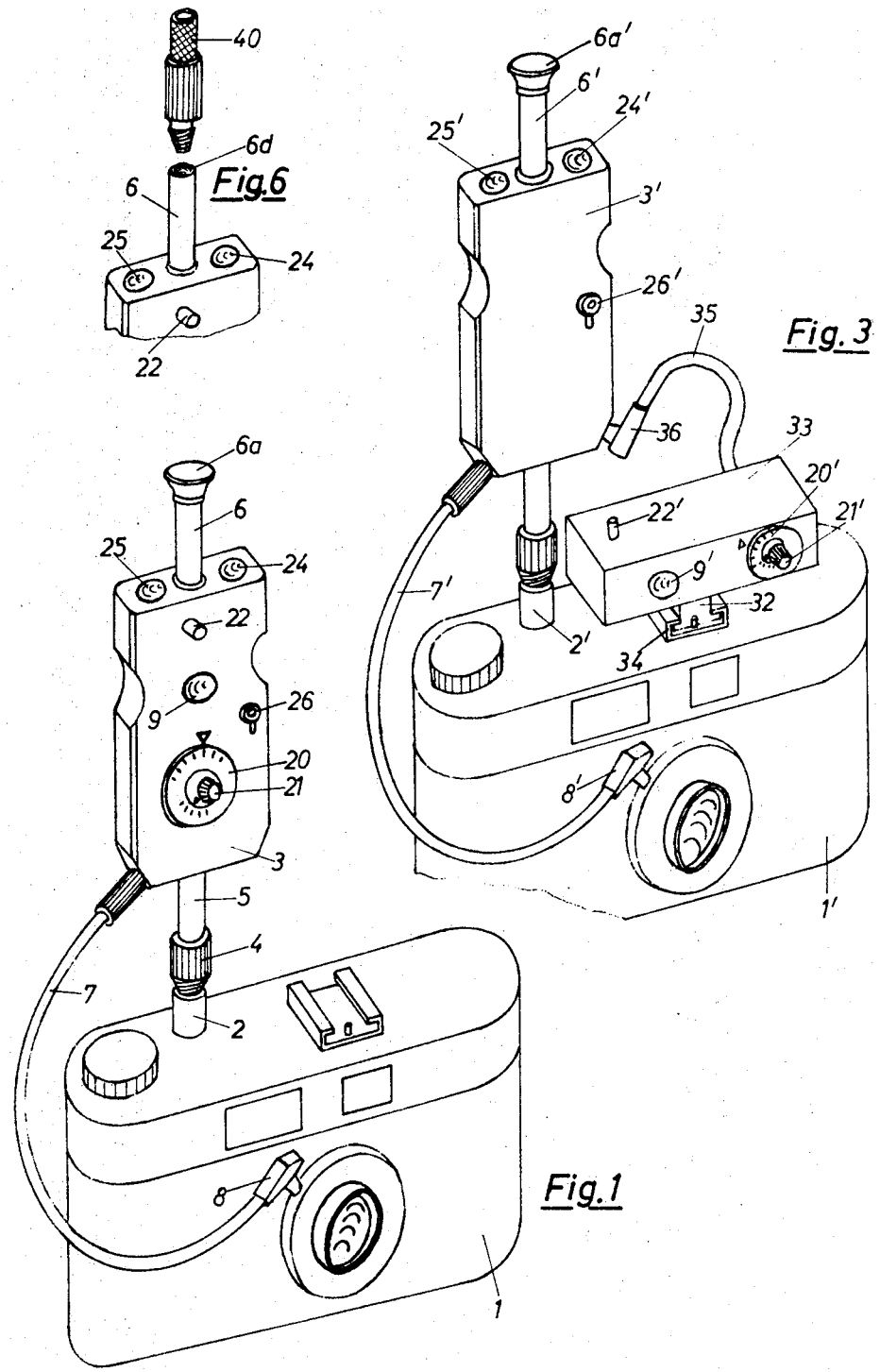

United States Patent

[11] 3,548,732

[72] Inventor Waldemar T. Rentschler
    Calmbach, Black Forest, Germany
[21] Appl. No. 668,085
[22] Filed Sept. 15, 1967
[45] Patented Dec. 22, 1970
[73] Assignee Prontor-Werk Alfred Gauthier G.m.b.H.
    Calmbach, Black Forest, Germany
[32] Priority Sept. 19, 1966
[33] Germany
[31] No. 40413

[54] EXPOSURE TIME CONTROL INSTRUMENT FOR ATTACHMENT TO A PHOTOGRAPHIC CAMERA EQUIPPED WITH A BULB DEVICE AND A FLASH CONTACT DEVICE
7 Claims, 6 Drawing Figs.

[52] U.S. Cl. .................................................. 95/53, 95/10
[51] Int. Cl. ...................................................... G03b 9/00
[50] Field of Search .......................................... 95/53.3, 53 electric, 10(C), 11.5, 53, 64(D); 307/252

[56] References Cited
UNITED STATES PATENTS

| | | | |
|---|---|---|---|
| 2,978,970 | 4/1961 | Fahlenberg | 95/53.3X |
| 3,103,618 | 9/1963 | Slater | 307/252X |
| 3,283,681 | 11/1966 | Singer et al. | 95/10C |
| 3,326,103 | 6/1967 | Topaz | 95/11.5X |
| 3,397,629 | 8/1968 | Mori et al. | 95/10C |
| 3,418,910 | 12/1968 | Rentschler et al. | 95/53.3 |
| 3,425,329 | 2/1969 | Starp | 95/53 |

Primary Examiner—John M. Horan
Assistant Examiner—Alan Mathews
Attorney—Arthur A. March ABSTRACT: An exposure time control instrument for attachment to the wire release terminal of a photographic camera equipped with both a bulb device and a flash contact device. This instrument has a plunger which is movable by manual actuation or by a spring drive and which brings about the release of the camera shutter and also releases for actuation the switched-on bulb device which holds the drive mechanism of the camera shutter in a position corresponding to the open position of the shutter blades for the duration of the exposure time. The bulb device is lockable in the release position by means of a locking device and is unlockable again after the exposure time interval for the purpose of freeing the release plunger, whereupon the plunger returns to its starting position under the influence of a spring and takes the bulb device out of action again. In addition, the control instrument has a shutter resistor and an electronic timing device influenceable by the shutter resistor. The electronic timing device includes a charging capacitor and another electrical switching device connectable to the terminal of the flash contact device on the camera side and controllable by the flash contact. The switching device is in positive connection with the timing device in such a manner that the charging process of the capacitor is started via the shutter resistor by the contact making impulse of the flash contact switch and the tripping process of the timing device, by means of which the unlocking of the locking device blocking the release plunger is caused via an electromagnet included in the electronic timing device. By this means, the plunger is released after the elapse of a time interval which depends on the influence of light on the shutter resistor and corresponds to a certain charging state of the capacitor.

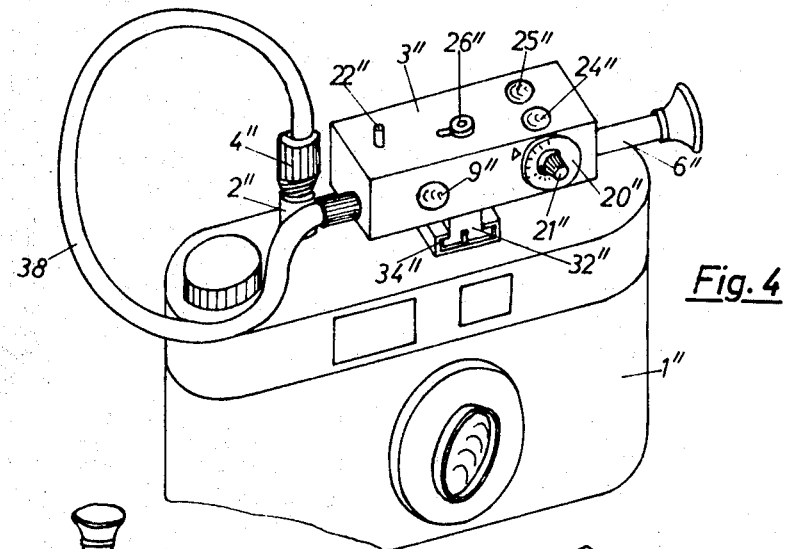
Fig. 4
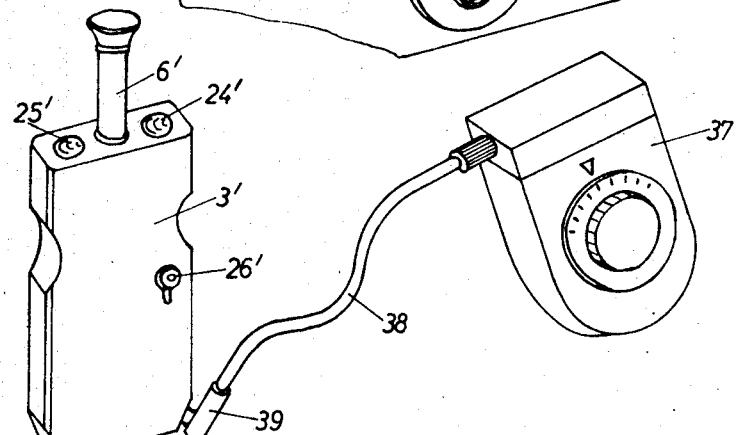
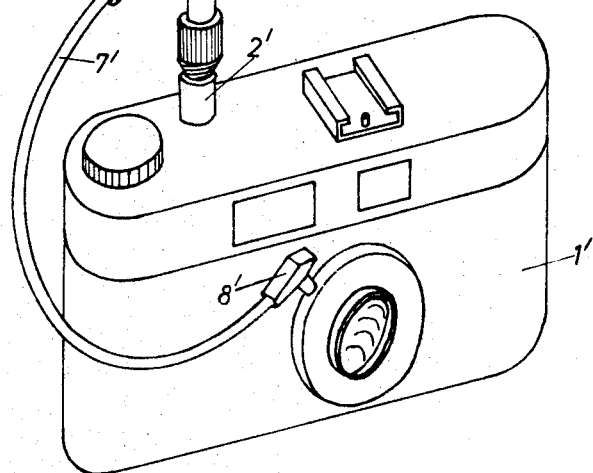
Fig. 5

EXPOSURE TIME CONTROL INSTRUMENT FOR ATTACHMENT TO A PHOTOGRAPHIC CAMERA EQUIPPED WITH A BULB DEVICE AND A FLASH CONTACT DEVICE

This invention relates to an exposure time control instrument which is attachable to the wire release terminal of a photographic camera equipped with both a bulb device and a flash contact device. The instrument has a plunger, movable either by manual actuation or by spring drive, which brings about the release of the camera shutter and frees for action the set bulb device which holds the drive mechanism of the camera shutter in a position corresponding to the open position of the shutter blades for the duration of the exposure time. The bulb device, in turn, is lockable in the release position by means of a locking device and is unlockable again after elapse of the exposure time interval for the purpose of releasing the release plunger, whereupon the latter, returning into its starting position under the influence of a spring, takes the bulb device out of operation again.

Release instruments are already known which are attachable to the camera for taking pictures with preselectable, ultralong exposure time. With the release instrument attached to the camera, the camera shutter is released first by actuating the instrument and locked in open position of the shutter blades until the exposure time, preset at the instrument, has run off, whereupon the shutter is released again and the shutter blades return into their closed position. When the photographer takes pictures with ultralong exposure time, such instruments save him the initiation of the closing motion of the shutter blades, but they do not relieve him from having to estimate, before taking the picture, the exposure time to be preset in accordance with the prevailing lighting conditions. However, experience has taught that estimating in advance the exposure time for taking pictures at dusk or at night must be called extremely difficult so that the photographer, in order to achieve good results, usually cannot help but take several pictures of one and the same object, using different exposure times.

Known technical tools, such as exposure meters with photoelements as a light-sensitive source are not usable in the brightness range encountered when taking dusk and night pictures because these instruments are not made sensitive enough for this purpose. According to experience, only exposure meters equipped with a photoresistor (CdS cell) are suitable for measurement in the aforementioned brightness range. But since exposure meters of this type have been commercially available only a relatively short time, millions of camera owners in possession of a camera with a built-in photoelement exposure meter or hand exposure meter with a photoelement have no ability to determine in advance, by measurement, the exposure times in question for dusk or night exposures. Therefore, to them there is left only the aforementioned method of experimenting, that is to say taking several pictures of one and the same object.

It is an object of this invention to eliminate this deficiency by providing a device which makes the taking of pictures with automatic exposure means possible with cameras of any kind, equipped with a wire release terminal and a flash contact device. Preferably, this automatic system is provided for a lighting intensity range in which, depending on the prevailing lighting conditions, exposure times in the order of about 1 sec. and longer result.

The foregoing object and other advantages can be readily attained in an exposure time control instrument of the type mentioned at the outset that has a photoresistor and an electronic timing device influenceable by the photoresistor, the electronic timing device including a charging capacitor. In addition, the instrument has an electrical switching device, connectable to the terminal at the camera side of the flash contact device and controllable by the flash contact. This switching device is in positive communication with the timing device in such a manner that the charging process of the capacitor via the photoresistor is started by the closing impulse of the flash contact switch. After the elapse of a time interval depending on the influence of light on the photoresistor and corresponding to a certain charging state of the capacitor, the tripping process of the timing device is released, by means of which the unlocking of the locking device blocking the release plunger is caused via an electromagnet included in the timing device. In this manner it is possible to create an accessory instrument for the photographic cameras which relieves the photographer taking dusk or night pictures not only from initiating the closing motion of the shutter, but, beyond this, from the difficult advance estimations of the exposure time to be preselected.

Pictures under lighting conditions that normally would be inadequate can thus be taken easily and with good results also by those photographers who have no specific experience whatever in this field, for, to take the picture, the exposure time control instrument merely has to be attached to the wire release terminal of the camera and connected electrically to its flash contact terminal. All adjustment operations are obviated thereby also, so that simple and safe handling for taking dusk and night pictures is guaranteed even under inadequate lighting conditions. The freedom from adjustments results in the first place from the fact that the starting of the electronic time circuit governing the time formation is not effected by any function of the instrument relating to the release path, but is effected via the flash contact of the respective camera shutter.

In a purposeful further development of the invention, a setting device is provided that includes setting scales for the diaphragm and film sensitivity as well as corresponding setters and means for influencing the path of rays ahead of the photographer and/or the electronic timing device. This setting device serves the consideration of the sensitivity of the film used as well as of the diaphragm value set at the camera. It is the purpose of this device to assure the applicability of the automatic exposure means for films of any sensitivity as well as of the choice of a diaphragm value (depth of focus) best suited for the respective motif to be photographed.

To provide the photographer with the ability of concluding the exposing process without the functioning of the automatic exposure means should the lighting intensity be completely insufficient, the invention further provides for the arrangement of a manually operable switch influencing the electronic circuit, by means of which the tripping process of the electronic timing device can be brought about independently of the effect of light on the photoresistor.

According to another provision of the invention, the exposure time control instrument can be designed in an advantageous and expedient manner with a plug-in foot fitting adapted to be disposed in the plug-in shoe of the camera, the plug-in foot having a contact, known as such, which cooperates with the flash contact terminal of the plug-in shoe. Such a one-piece instrument that can be plugged into the viewfinder shoe of the camera, needs nothing more than the wire release terminal to connect it functionally with the camera.

Another design of the exposure time control instrument especially suited for certain types of cameras is of a two-part design, one part forming a subassembly comprising the photoresistor and the device for the consideration of film sensitivity and diaphragm values. This subassembly is accommodated in a separate housing and is attachable by means of a plug connection to another housing containing the release plunger and the components of the electronic timing device. This design facilitates the connection of the wire release, particularly in those cameras equipped with a relatively inaccessible wire release terminal. It also provides the technical prerequisites for a remote camera release requiring the use of a long wire release connecting cable between the releasing instrument and the camera.

To inform the photographer taking pictures with the exposure time control instrument of the exposure time to be expected in accordance with the prevailing lighting conditions even before he takes the picture, the invention provides further for the arrangement of an indicating device, consisting of at least one lamp connectable to the electronic timing device by means of a switch, that informs him as to whether an exposure time within the working range of the automatic exposure means is obtainable under the prevailing lighting intensity and the preselected diaphragm setting.

According to another feature of the invention, an instrument providing time regulation independent of lighting conditions and equipped with various, adjustable resistors is connectable to the housing containing the release plunger and the electronic timing device instead of the subassembly comprising the photoresistor and the device for the consideration of film sensitivity and diaphragm values. This device allows the use of one and the same releasing and timing instrument for both the automatic exposure means and for exposures with exactly predetermined exposure times.

Figure 2:
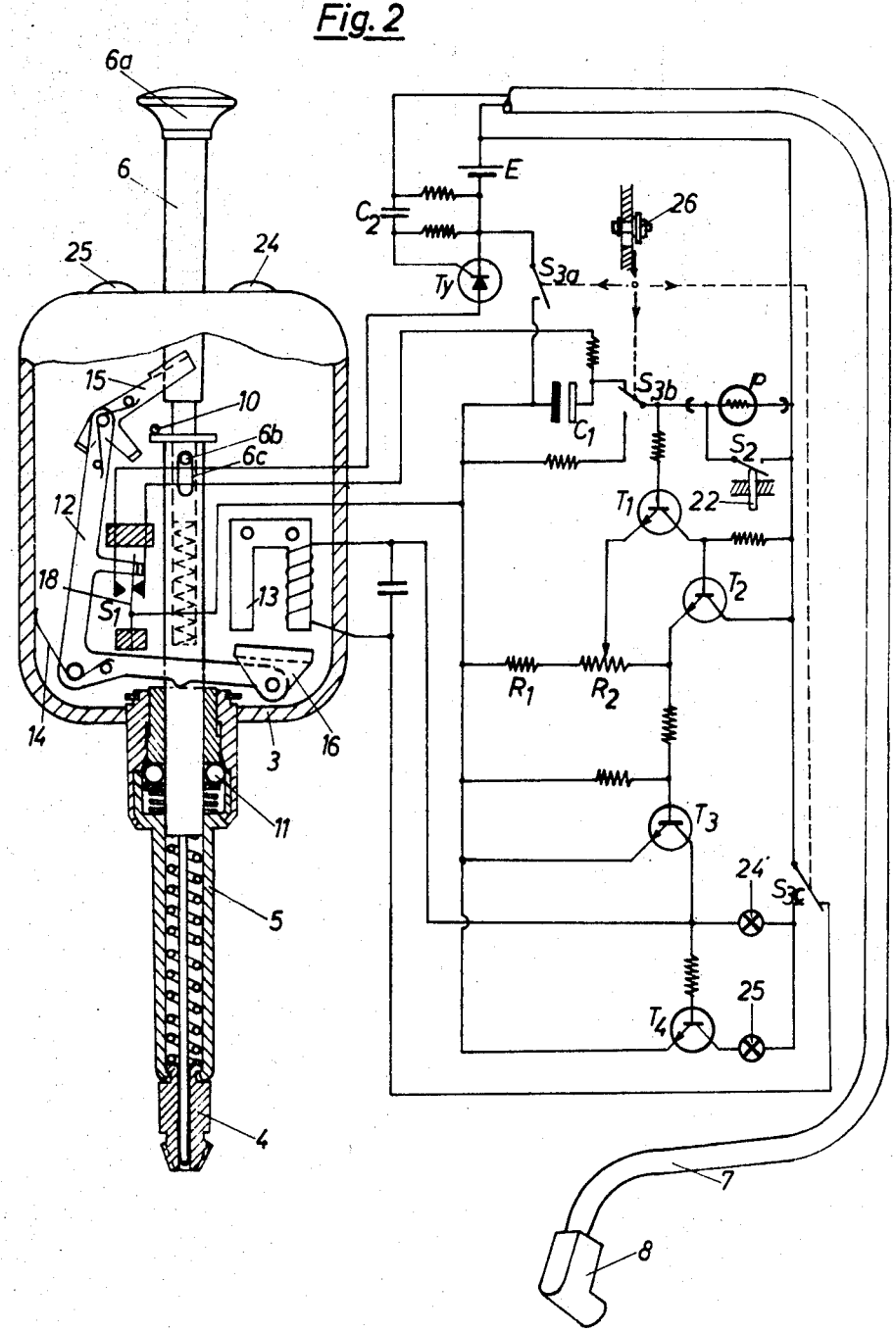

Other objects and advantages will be readily apparent from the following detailed specification and the attached drawings wherein:

FIG. 1 is a perspective view of the exposure time control instrument of this invention attached to the release plunger of a photographic camera and electrically connected to the camera flash contact by means of a cable, FIG. 2 is a cross-sectional view through the exposure time control instrument of this invention in conjunction with a wiring diagram of the electronic timing device which includes an indicating device and a contact making switch, FIG. 3 is a perspective view of another version of the exposure time control instrument of this invention wherein the photoresistor as well as the subassembly serving the consideration of the film sensitivity and diaphragm factors as well as the contact making switch are disposed in a separate housing of their own plugged into the viewfinder shoe of the camera, FIG. 4 is a perspective view in another embodiment of an exposure time control instrument of this invention which can be plugged into the viewfinder shoe of the camera, FIG. 5 is a perspective view of another embodiment of the exposure time control instrument of this invention, that is similar to the arrangement in FIG. 4, wherein an instrument for the manual preselection of the exposure time is connected instead to the subassembly accommodated in a separate housing which includes among other items, the photoresistor, FIG. 6 is a partial perspective view of the upper part of the exposure time control instrument of this invention having a release plunger threaded for connecting a flexible wire release cable.

Referring now to the drawings, there is illustrated a photographic camera, designated by the reference numeral 1, which may be equipped with an objective shutter, not shown in detail, of any design. It is only important that a shutter arrangement be involved which, for reasons explained below in greater detail, has a bulb device, known as such, and also a flash contact device with a plug-in bushing for connecting a flash instrument. The release plunger 2 of the camera is provided with a conical thread, traditionally serving to connect the threaded nib of a wire release. Further, the camera briefly described above is of a model which, besides the bulb setting range, provides only for the additional possibility of setting short exposure times of less than 1 sec.

The following description concerns an exposure time control instrument which, designed as accessory instrument and, when attached to the camera as illustrated in the drawing, automatically regulates the duration of the exposure when taking pictures with ultralong exposure time by action upon the bulb device in cooperation with the flash contact device.

According to the implementation example shown in FIG. 1, the exposure time control instrument comprises a housing 3 to which a tube 5 provided with a rotatable, threaded nib 4 is fastened. Guided in this tube is a plunger 6 which is axially movable against the force of a spring and whose end, which protrudes out of the housing 3, is provided with a push button 6a. To electrically connect an electronic timing device, accommodated in the housing 3 and described below in greater detail, to the flash contact device disposed in the shutter, a flexible cable 7 is disposed at the exposure time control instrument whose free end carries a plug 8. In a sidewall of the housing 3, a window 9 is provided behind which a photoresistor P is disposed in the circuit of the aforementioned electronic timing device.

As to the specific structural design of the exposure time control instrument, provision is made, as shown in FIG. 2, for the plunger 6 to be of telescoping type, whereby the relative mobility of the plunger parts is limited by a pin-slot connection 6b, 6c and the axial mobility of the plunger as a whole is limited in one direction by a fixed pin 10. For the arrestment of the plunger 6 in the released position a detent 11 is provided which is influenceable by a rotatably mounted angular lever 12. This angular lever 12, being under the influence of a spring 14, cooperates at one end with the plunger 6 and at the other end with an electromagnet 13. For this purpose, the angular lever 12 carries at one end an articulated and elastically supported escape pawl 15 and at the other end a pin-mounted magnet armature 16.

As is evident from the wiring diagram shown in FIG. 2, the above mentioned electronic timing device has emitter-coupled transistors $T_1$ and $T_2$. Assigned to the latter is a switching transistor $T_3$ and to it, in turn, an electromagnet 13 is connected. To establish the threshold value of the circuit, a fixed resistor $R_1$ and a variable resistor $R_2$ can be provided. In another circuit of this device there is a capacitor $C_1$ assigned to the transistor $T_1$, and in addition, the photoresistor P to regulate the exposure time depending on lighting conditions. In order to make the timing device function exactly when the shutter opens the objective aperture, a thyristor Ty, acting as an electronic switch, precedes the time control circuit and is disposed in a connecting line leading from the negative pole of a power source E to the electronic timing device and is ignitable by means of the flash contact device located in the camera shutter. A reversing switch $S_1$, electrically connected with the thyristor Ty, is provided for the purpose of short-circuiting the capacitor $C_1$, which is accomplished by reversing the contact spring 18, movable together with the angular lever 12, from one point of contact to the other. The grid of the thyristor Ty is connectable with the flash contact device of the camera via the cable 7 which establishes synchronous with the opening of the objective aperture of the shutter, an electrical connection between the grid and the positive pole of the power source E. In the grid circuit of thyristor Ty there is also provided a capacitor $C_2$ which, when contact is made by the flash contact device, initiates the ignition of the thyristor Ty, the consequence being that the timing device is now supplied with current until this device has concluded its function.

Since the above described exposure time control instrument equipped with an electronic timing device is to be employed primarily for taking dusk and night pictures, the circuit is expediently laid out so that exposure times in the order of 1 sec. to about 10 sec. or longer are achievable. The restriction to a shortest exposure time of about 1 sec. results from using a mechanical release instrument with a pressure plunger according to FIGS. 1 and 2. Here, during the releasing process the shutter remains open at least as the finger pressure rests on the plunger, whereby, according to experience, after release has taken place, removal of the load does not occur before the elapse of 1 sec. Hence, the lower limit of the shortest exposure time is given automatically. When taking pictures in poor lighting intensity to be able to also consider at the same time, for timing purposes, the film sensitivity and the diaphragm setting of the camera, the photoresistor P can be expediently preceded by a shading device, adjustable by means of turning knobs 20 and 21. Either a series diaphragm known as such or a gray wedge could be used for this purpose.

It may happen that when taking dusk or night pictures the influence of light on the photoresistor P of the above described exposure time control instrument is so weak that an activation of the electronic time forming device takes place only after 10 sec. or not at all. To provide the photographer with the ability to interfere in such cases with the runoff of the function of the electronic timing device, a manually operable contact-making switch $S_2$ is provided in a circuit parallel to the photoresistor P, as illustrated in the wiring diagram of FIG. 2. A push button 22, guided so as to be movable in housing 3 of the exposure time control instrument, serves to actuate this switch. When this switch is actuated, the consequence is a bridging of the photoresistor P.

Photographers taking pictures with a camera with automatic exposure means often attach importance to knowing in advance which exposure time value will appear under the prevailing lighting conditions. For this reason, the above described exposure time control instrument is equipped additionally with an indicating device which indicates whether the exposure time to be expected lies above or below a certain limital exposure time value by means of two lamps 24 and 25 includable in the circuit of the electronic timing device. These lamps can be turned on by means of a test key 26 movably guided in the housing 3. The transistor $T_3$ is assigned to the lamp 24, and the lamp 25 cooperates with a transistor $T_4$ whose base is connected to the collector circuit of the transistor $T_3$. As illustrated in the wiring diagram in FIG. 2, there is further arranged in an additional circuit, a resistor $R_3$ which can be put in series with the photoresistor P by means of a switch $S_{3b}$. By means of additional switches $S_{3a}$ and $S_{3c}$ the indicating device can be connected to the power source E to circumvent the thyristor Ty. When the above mentioned test key 26 is actuated, all of the switches $S_{3a}$, $S_{3b}$ and $S_{3c}$ are closed which, for the purpose of moving in unison, are in positive connection with the test key 26 by means of suitable transmission members indicated merely by a dotted line in the wiring diagram according to FIG. 2. As is further evident from the wiring diagram, the two switches $S_{3b}$ and $S_{3c}$ are designed as reversing switches. The switch $S_{3b}$ serves to connect the photoresistor P alternately with the capacitor $C_1$ or the resistor $R_3$ while the switch $S_{3c}$ connects either the electronic timing device or the lamps 24 and 25 of the indicating device with the power source E.

The handling and operation of the above described exposure time control instrument according to FIGS. 1 and 2 is as follows.

If the photographer wants to take pictures with exposure time setting dependent on lighting conditions with the above described exposure time control instrument in darkness or in twilight, he only has to attach the instrument, as illustrated in FIG. 1, to the release plunger 2 of the camera set to the bulb range and place the plug 8 of the cable 7 into the terminal of the flash contact device on the camera side. If the plunger 6, after prior consideration of the film sensitivity and diaphragm values set at the camera, is depressed at the exposure time control instrument, then, directly before the release of the shutter, the reversal of the switch $S_1$ is effected and the armature 16 contacts the magnet 13, while the detent 11 prevents the plunger 6, for the time being, from returning into its starting position. After the shutter's opening and closing system has reached the open position in which the bulb device functions, the flash contact device, by making contact, supplies voltage to the capacitor $C_2$, thus igniting the thyristor Ty and furnishing current to the electronic timing device. The two transistors $T_2$ and $T_3$ now become activated, while transistor $T_1$ remains blocked. A magnet field is built up in electromagnet 13 thereby holding the angular lever 12 in abutting relationship thereto due to the influence of the electromagnet 13 on the armature 16. Synchronously with the above described functional runoff, the capacitor $C_1$ of the timing device charges, thereby governing the exposure time.

After charging is completed, the transistor $T_1$ becomes active so that the two transistors $T_2$ and $T_3$ are suddenly blocked, the consequence of which being that the magnet 13 releases the lever 12 which, under the influence of the spring 14, strikes against the detent 11 at the end of a rotational motion and thereby unlocks the plunger 6. After release of the camera's release plunger 2 at the end of the light-dependent exposure time interval, the function of the bulb device of the camera shutter is concluded, and the latter, in turn, frees the opening and closing system of the shutter for return into closed position.

When taking pictures at night, if the photographer finds that, under the prevailing lighting conditions, the maximum exposure time resulting from the functional runoff of the electronic timing device would be exceeded, he has the ability to bring about the conclusion of the exposing process by actuating the push button 22 acting upon the contact-making switch $S_2$. The photographer can ascertain before taking the picture whether the prevailing lighting conditions will result in an exposure time within or outside of the limited time range of, say, 1 sec. to 10 sec. by operating the test key 26. If the light intensity is so weak that an exposure time outside of the above mentioned range would appear, this will be indicated by the lamp 24 (red) lighting up. But if the lighting conditions are more favorable, namely so that an exposure time of less than 10 sec. would appear, then the lamp 25 (green) will light up.

In accordance with the implementation example illustrated in FIG. 3, the exposure time control instrument can also be of two-part design. Otherwise, however, there is complete coincidence with regard to the components required to obtain the function striven for, for which reason the components are marked with the same reference symbols, except that a prime symbol (') is added. The housing 3' is attachable to the connecting thread of the camera's release plunger 2' and accommodates the electronic time control circuit, the indicating lamps 24' and 25' as well as the test key 26'. A photoresistor as well as the setting device, influenceable by the setters 20' and 21', for the consideration of diaphragm and film sensitivity values being set at the camera side are accommodated behind a window 9' in a housing 33 which is provided with a plug-in foot 32 which can be plugged into the camera's viewfinder shoe 34. There is also provided in the housing 33 the parallel circuit serving to bridge the photoresistor P, influenceable by a push button 22' and including the contact-making switch $s_2$. In the same manner as in the arrangement according to FIG. 1, a cable 7', electrically connectable to the flash contact device accommodated in the camera shutter by means of a plug 8', is connected to the housing 3' which is provided with a plunger 6'. To electrically connect the subassembly disposed in the housing 33 with the electronic timing device located in the housing 3', a cable 35 is provided which can be plugged into a receptacle provided at housing 3' by means of a plug 36. If, in this arrangement, correspondingly long connecting cables 7' and 35 and also a flexible, intermediate wire release cable are used instead of the direct connection to the camera, then the camera can be released from a distance by remote control.

Another design of the exposure time control instrument coming very close to that described in FIGS. 1 to 3 is illustrated in FIG. 4. This instrument is of one-part design and can be plugged into a plug-in shoe 34" of camera 1" by means of a plug-in foot 32" disposed at the housing 3". The plug-in shoe 34" is provided with a center contact known as such to which is assigned a countercontact disposed at the plug-in foot 34". When attaching the exposure time control instrument, a connection between the electronic timing device and the flash contact device disposed in the camera 1" is thereby automatically established. In the same manner as the implementation example according to FIGS. 1 to 3, the arrangement shown in FIG. 4 is provided with a plunger 6", a photoresistor disposed behind a window 9", setters 20" and 21" for the consideration of film sensitivity and diaphragm values, and also with a push button 22" acting upon the contact-making switch $S_2$ as well as with a test key 26". In the same manner as already described, indicating lamps 24" and 25" can be included in the circuit of the electronic timing device disposed in the housing 3" for actuation by the key 26. For the purpose of transmitting during the releasing process the finger pressure acting upon plunger 6" to the release plunger 2", there is connected to the exposure time control instrument a flexible wire release cable 38 whose end is provided with a threaded nib 4". The handling and operation of this exposure time control instrument matches precisely the two arrangements described above.

There is illustrated in FIG. 5 a concept of an exposure time control instrument which corresponds to that illustrated in FIG. 3, except that here, instead of the subassembly including the photoresistor P accommodated in housing 33, a time preselection instrument 37 is connected that provides for the time regulation dependent on lighting conditions and is equipped with various, adjustable resistors. The basic unit of the exposure time control instrument has the same reference symbols as in FIG. 3 and is similarly attachable to the camera's release plunger 2'. In the same manner, a connection with the flash contact device disposed at the camera side is established by means of a cable 7' and a plug 8'. An electric cable 38 has a plug 39 at one end that can be plugged into a receptacle serving, in the implementation example according to FIG. 3, to receive the plug 36, and serves to connect the time setting instrument to the exposure time control instrument. With the aid of the time preselection instrument 37, it is possible to include one of several fixed resistors accommodated in this instrument into the circuit of the electronic timing device instead of the photoresistor P of the subassembly housed in the housing 33. With the exposure time control instrument designed as shown in FIGS. 3 and 5 the possibility exists that besides twilight and night exposures, it is possible to take additionally, pictures with time preselection, using the automatic exposure means.

Differing from what is shown in FIG. 1, the plunger 6 of the exposure time control instrument could receive, according to FIG. 6, a threaded extension 6d which enables the flexible cable 40 of a simple wire release to be connected to the instrument for the purpose of making a remote release possible, for instance. Such a wire release can also be used whenever it is desired to bring about a release of the camera without moving it.

As already explained, the exposure time control instrument described above and shown in various designs can be used in a range of lighting intensities resulting in exposure times of about 1 sec. to 10 sec. and longer. However, the circumvent the aforementioned functional dependence of the closing process on the removal of the load from the instrument's plunger, the mechanical part of the exposure time control instrument could also be laid out so that the plunger 6, acting upon the camera release 2, is actuated by a manually releasable relay and is returned after the elapse of the exposure time into its starting position by means of a spring force that is released by the electronic timing device. For this purpose, the exposure time control instrument could, for example, be provided with a manually operable slide cooperating with a shutter release mechanism disposed on a supporting plate which can move lengthwise. Further assigned to this release mechanism having positive action a plunger can be provided that is biased against the supporting plate and acts upon the camera release. Thereby, the supporting plate would have to be transferred into cocked position, against the force of return springs, by means of the slide. After releasing the wound shutter release mechanism, the photographic shutter would open by means of the plunger. As soon as an exposure time commensurate with the lighting conditions is reached, the locking of the supporting plate would have to be canceled out by means of the electronic timing device. The plate as well as the plunger acting upon the camera release could then, independent of the duration of the load on the instrument's release, return into its starting position under the influence of the return springs and close the shutter again. With such an instrument, not only exposure times of 1 sec. and longer could be achieved automatically depending on lighting conditions, but, beyond this, shorter exposure times could be achieved because the time formation in such an instrument is independent of the load on the release plunger.

It will be understood that the foregoing description with the details of exemplary structure is not be to be construed in any way to limit the invention, but that modifications may be made thereto without departing from the scope of the invention as set forth in the following claims.

I claim:

1. An exposure time control instrument attachable to the wire release terminal of a photographic camera equipped with both a bulb device and a flash contact device comprising a movable plunger which brings about the release of the camera shutter and also releases for action the switched-on bulb device which holds the drive mechanism of the camera shutter in a position corresponding to the open position of the shutter blades for the duration of the exposure time; the bulb device being lockable in the release position by means of a locking device and is unlockable again after elapse of the exposure time interval for the purpose of freeing said release plunger, whereupon said plunger, returning into its starting position under the influence of a spring, takes the bulb device out of action again, said control instrument having a photoresistor and an electronic timing device influenceable by said photoresistor, said electronic timing device including a charging capacitor and another electrical switching device connectable to the terminal of the flash contact device on the camera side and controllable by the flash contact, said switching device being in positive connection with said timing device in such a manner that the charging process of said capacitor is started via said photoresistor by the contact-making impulse of the flash contact switch and the tripping process of a said timing device, by means of which the unlocking of said locking device blocking said release plunger is caused via an electromagnet included in said electronic timing device so that said plunger is released after elapse of a time interval which depends on the influence of light on said photoresistor and corresponds to a certain charging state of said capacitor.

2. The exposure time control instrument of claim 1 having a setting device with setting scales for diaphragm and film sensitivity values and corresponding setters, said setting device having means for influencing the path of rays ahead of said photoresistor and said electronic timing device, said setting device serving the consideration of the sensitivity of the film used as well as of the diaphragm value set at the camera.

3. The exposure time control instrument of claim 2 having a manually operable switch influencing the electronic circuit by means of which the tripping process of said electronic timing device can be brought about independently of the influence of light on said photoresistor.

4. The exposure time control instrument of claim 2 having a plug-in foot adapted to fit a plug-in shoe of the camera, said plug-in foot having a contact cooperating with the flash contact terminal of the plug-in shoe.

5. The exposure time control instrument of claim 2 wherein said instrument is a two-part design, one part being formed by a subassembly including said photoresistor and said device for the consideration of film sensitivity and diaphragm values, said subassembly being accommodated in a separate housing attachable by means of a plug connection to another housing containing said release plunger and the components of said electronic timing device.

6. The exposure time control instrument of claim 2 having an indicating device consisting of at least one lamp connectable to said electronic timing device by means of a switch, said lamp being adapted to indicated whether an exposure time within the working range of the automatic exposure means is to be expected, considering the lighting intensity prevailing at the time and the diaphragm st setting selected in advance.

7. The exposure time control instrument of claim 2 wherein said instrument is a two-part design, one part having time regulation means independent of lighting conditions equipped with various adjustable resistors disposed therein, said subassembly being attachable to another housing containing said release plunger and said electronic timing device.